Patented Feb. 5, 1946

2,394,244

UNITED STATES PATENT OFFICE 2,394,244

PROCESS FOR CRYSTALLIZING HYGROSCOPIC INORGANIC COMPOUNDS

Vaman R. Kokatnur, New York, N. Y., assignor to Autoxygen Inc., New York, N. Y., a corporation of New York No Drawing. Application October 1, 1935, Serial No. 43,057

9 Claims. (Cl. 23—91)

The production of anhydrous material from a solution of caustic soda, caustic potash or the like has heretofore presented numerous difficulties, has been an expensive process and has in most instances resulted in allegedly anhydrous end products which were difficult and hazardous to handle.

Several factors have rendered prior processes of drying such solutions or evaporating such solutions highly expensive. These include the use of elaborate equipment such as fusion pots, multiple effect evaporators and single effect evaporators. Fuel costs are high due to temperatures at which the solutions have, of necessity, been treated by prior processes.

The removal of water from other materials such for instance as zinc chloride, magnesium chloride, magnesium sulphate, etc., wherein the water is held chemically rather than mechanically, presents still different problems and much expensive special apparatus has been designed for effecting the drying of such hydrolyzable solutions. The formation of anhydrous end products from such solutions has heretofore involved still other difficulties due to the liberation of free hydrochloric acid as the solution hydrolizes at the elevated temperatures required for drying, such acid rapidly corroding the equipment.

I have discovered that all such materials where drying has heretofore required excessively high temperatures (with or without hydrolysis and its undesirable consequences) can be dried most economically in simple standardized apparatus by using as an incident of such drying, a principle of partial pressure distillation.

In the specific application of this general type of process to the drying problems outlined above, the solution to be dried is mixed with an inert hydrocarbon diluent which is immiscible with water. Kerosene is well suited for the purpose but equivalent hydrocarbons preferably having a boiling temperature of between 150° C. and 300° C. may be used. The mixture of the solution and the immiscible hydrocarbon diluent is distilled in an ordinary still until by partial pressure distillation all of the water which is mechanically or chemically combined with the desired end product, has been driven off.

For purposes of a clear understanding of this case I wish to define partial pressure distillation as a distillation wherein the vapor pressures of the two components in a three component system are additive and hence utilized to remove one component by using excess of another component. This is in direct contradistinction to azeotropic distillation in which azeotropic mixtures are constant boiling point mixtures and the distillate is composed of all components of them.

The amount of diluent required to be distilled off to remove all of the water will vary with the different solutions to be dried and with the diluent used. However the amount of diluent which must be distilled off in any given case may be conveniently calculated by the following formula:

$$\frac{mA}{m'B} = \frac{PAMA}{PBM'B}$$

In the foregoing formula A and B represent the two immiscible diluents, namely water and hydrocarbon; $m$ and $m'$ represent the weights of the two materials distilled out and M and M' represent the molecular weights of A and B and P represents the partial pressure of A and B at the temperature of distillation.

This process permits the removal of water at a temperature much lower than that which has previously been required to effect complete water extraction. One advantage of this is that where the materials under treatment are hydrolyzable at high temperatures, hydrolysis is reduced to a minimum. Consequently the corrosion of equipment by free acids which might be liberated is very substantially minimized. A contributory factor is not only the low temperatures employed but the protective action of the hydrocarbon diluent on the metal parts.

I have found that in using steel or iron equipment, corrosion in my process is in the order of only $\frac{1}{10}$ to $\frac{1}{20}$ of the corrosion which occurs in prior processes utilizing higher temperatures.

The advantage of using standard iron equipment will of course be obvious. The use of the process effects a saving of about 50% of the manufacturing cost where the caustic solutions are being dehydrated.

I shall now describe certain specific detailed examples of the manner in which my process may be economically carried out in practice. It is specifically to be understood however that these examples are given purely for illustrative purposes, the many variations of the process of these specific examples being wholly within the spirit and scope of the invention.

EXAMPLE I

*Producing anhydrous caustic soda*

180 parts of a solution of caustic soda containing about 10% of caustic soda by weight, are mixed with 300 parts of kerosene and this mixture is distilled in a standard still. The mixture is agitated during gradual heating of the still and the water begins to distil off below 100° C., water removal being completed by the time the distillation temperature has approximated 200° to 225° C. In removing this water, about 126 parts of kerosene will have been distilled off, leaving 174 parts remaining in the still. The ten parts of caustic soda which remain behind in the still, together with the kerosene, are absolutely anhydrous and in granular form. Removal of the residue of the kerosene diluent may be effected by decanting or any other convenient or conventional manner. The granular caustic soda which remains contains less than a fraction of a per cent of kerosene superficially adhering to the material but the presence of this negligible amount of kerosene has very definite advantages in the use of the final product. The slight kerosene residue adhering to the caustic soda particles aids in retarding corrosion of metallic containers in which the caustic soda may be packaged, renders the soda more stable and less corrosive to the skin and otherwise more generally suitable for commercial and household use.

Another advantage of my process, particularly as applied to production of anhydrous caustic soda, is the fact that the air in the manufacturing plant is not contaminated with caustic soda. There is less danger of skin irritation of the operatives in the plant. Caustic plants are notorious for accidents to employees not only in handling the caustic but during the standard process of fusing. The caustic produced by the present process is so stable that it can actually be carried in the hand for a short length of time without producing a burn and as above noted it does not get in the air, minimizes accidents in the household and prolongs the life of the tins in which it is packaged.

The amount of kerosene required to dehydrate the solution completely from solutions of various strength, are roughly as follows:

To remove 100 parts of water from a 4.77% caustic solution requires about 70 parts of kerosene. A 9% solution requires about 70 parts. A 14-25% caustic solution requires about 100 parts. More specifically, to make anhydrous NaOH:

| Per cent NaOH | Kerosene required to make 1 lb. NaOH | Lbs. kerosene to remove 1 lb. H₂O |
|---|---|---|
| 4.77 | 14.2 | 0.71 |
| 9.1 | 7.03 | 0.703 |
| 10.0 | 5.99 | 0.662 |
| 15 | 5.22 | 0.907 |
| 20 | 4.42 | 1.10 |

What is true with caustic soda solution is substantially true with caustic potash solutions, although the amounts of kerosene required for solutions of different strength necessarily vary.

EXAMPLE II

*Production of anhydrous zinc chloride*

500 parts of zinc chloride solution containing 600 parts of zinc chloride may be mixed with 600 parts of kerosene and the mixture heated and agitated in the still. After complete elimination of water, approximately 450 parts of kerosene will have been driven off, the water elimination occurring in the temperature range of from 212 to 360° F. The resultant product is white and granular and the hydrolysis of the chloride less than 1%.

EXAMPLE III

*Production of anhydrous magnesium chloride*

240 parts of a solution containing 95 parts of magnesium chloride may be mixed with 500 parts of kerosene and distilled in a standard still during the complete removal of water. Not even 380 parts of kerosene will be driven off as the still passes through the temperature range of 190 to 360° F. The hydrolysis of this process is about 13 to 14% of the hydrolysis which would normally occur with standard processes. The product is white and granular.

It should be borne in mind that while I have used kerosene as the hydrocarbon diluent in the illustrated examples, any equivalent material, having an approximately similar boiling range, may be substituted. The substitution of such materials such as naphthalene, dichlorbenzenes, dichlortoluenes or coal tar distillates and certain of their derivatives boiling at temperatures above 160° C., will necessarily involve adjustments in the amount of the diluent added to the solution to be dried, and in the amount of diluent driven off to effect complete removal of water and in the boiling range at which water is completely eliminated. All of the diluents, however, except certain chlorine derivatives seem to retard corrosion of the metal parts materially, and the presence of a minute amount of diluent in the granular product in drying has beneficial effects.

Having thus described my invention, what I claim as new and desire to secure by Letters Patent is:

1. As a new article of manufacture, anhydrous, granular caustic soda, each particle whereof has a superficial coating of kerosene.

2. As a new article of manufacture, anhydrous, granular zinc chloride, each particle whereof has a superficial coating of kerosene.

3. As a new article of manufacture, anhydrous, granular magnesium chloride, each particle whereof has a superficial coating of kerosene.

4. A method of dehydrating aqueous alkali metal hydroxide liquors while preventing substantial corrosion of the dehydrating equipment by the hydroxide and consequent contamination of the hydroxide which comprises mixing an oil with an aqueous solution of an alkali metal hydroxide and heating to evaporate the solution and cause precipitation of solid hydroxide, and agitating the mixture to prevent substantial separation of said oil from said solution, the concentration of said oil being of sufficient magnitude to cause the formation of a corrosion resistant film about hydroxide granules as they are precipitated, said film being of sufficient thickness to inhibit substantial corrosion of the equipment by the hydroxide.

5. A method of dehydrating aqueous alkali metal hydroxide liquors while preventing substantial corrosion of the dehydrating equipment by the hydroxide and consequent contamination of the hydroxide which comprises mixing a nonreactive liquid coating agent with an aqueous solution of an alkali metal hydroxide and heating to evaporate the solution and cause precipitation of solid hydroxide, and agitating the mixture to prevent substantial separation of said agent from said solution, the concentration of said coating agent being of sufficient magnitude to cause the formation of a corrosion resistant film about hydroxide granules as they are precipitated, said film being of sufficient thickness to inhibit substantial corrosion of the equipment by the hydroxide.

6. A method of dehydrating aqueous caustic soda liquors while preventing substantial corrosion of the dehydrating equipment by the caustic soda and consequent contamination of the caustic which comprises evaporating a mixture of said liquors and a nonreactive liquid coating agent, the amount of said agent and the manner of conducting said vaporization being such that a protective film is formed upon at least a portion of the exposed walls of the evaporating compartments and upon solidified caustic particles as they are formed.

7. A method of dehydrating aqueous solutions of sodium hydroxide while preventing substantial corrosion of the dehydrating equipment by the hydroxide and consequent contamination of the hydroxide which comprises mixing a nonreactive liquid coating agent with an aqueous solution of sodium hydroxide, heating to evaporate the solution and cause precipitation of solid sodium hydroxide and agitating to prevent substantial separation of said agent and said solution into layers during evaporation, the concentration of said agent being of sufficient magnitude to cause the formation of a corrosion resistant film about hydroxide granules as they are precipitated.

8. A method of dehydrating aqueous solutions of sodium hydroxide while preventing substantial corrosion of the dehydrating equipment by the hydroxide and consequent contamination of the hydroxide which comprises mixing an oil with an aqueous solution of sodium hydroxide, heating to evaporate the solution and cause precipitation of solid sodium hydroxide and agitating to prevent substantial separation of said oil and said solution into layers during evaporation, the concentration of said oil being of sufficient magnitude to cause the formation of a corrosion resistant film about hydroxide granules as they are precipitated.

9. An anhydrous, granular, crystalline solid of the group consisting of sodium hydroxide, zinc chloride, and magnesium chloride, each particle whereof has a superficial coating of kerosene.

VAMAN R. KOKATNUR.